United States Patent Office 3,422,065
Patented Jan. 14, 1969

3,422,065
HIGH MOLECULAR WEIGHT POLYCARBONATES
Claus Wulff, Krefeld, Hermann Schnell, Krefeld-Uerdingen, and Ludwig Bottenbruch, Krefeld-Bockum, Germany, assignors to Farbenfabriken Bayer Aktiengesellschaft Leverkusen, Germany, a corporation of Germany
No Drawing. Filed Oct. 19, 1965, Ser. No. 498,150
Claims priority, application Germany, Oct. 27, 1964,
F 44,321/64
U.S. Cl. 260—47         9 Claims
Int. Cl. C08g 17/23

ABSTRACT OF THE DISCLOSURE

A high molecular weight polycarbonate prepared from the reaction of a carbonic acid derivative and a compound having the formula

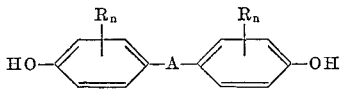

wherein A is a cyclododecylene radical and R is selected from the group consisting of alkyl, aryl, cycloalkyl, alkoxy and halogen and $n$ is an integer equal to 0 to 4.

This invention relates generally to polycarbonates and more particularly to linear high molecular weight polycarbonates.

It is known that linear high molecular weight thermoplastic polycarbonates may be prepared from the reaction of di(monohydroxy-aryl)-alkanes or mixtures of di-(monohydroxy-aryl)-alkanes and aliphatic, cycloaliphatic and aromatic dihydroxy compounds or in general, mixtures of at least one aliphatic or cycloaliphatic and at least one aromatic dihydroxy compound or di-(monohydroxy-aryl)-sulfones or mixtures of di-(monohydroxy-aryl)-sulfones with other difunctional hydroxy compounds with carbonic acid derivatives such as aliphatic, cycloaliphatic and aromatic diesters of carbonic acid, phosgene and bis-chloro carbonic acid esters of organic dihydroxy compounds.

Polycarbonates prepared from bis-(hydroxy-phenyl)-cycloalkanes, e.g, the cyclohexane and the norbornylidene derivatives exhibit increased solubility and increased second order transition points in comparison with polycarbonates from bis-(hydroxy-aryl)-alkanes. Surprisingly, however, these bis-(hydroxy-phenyl)-cycloalkanes crosslink only after heating for several hours to temperatures within the range of from 350 to 500° C. Heating at these elevated temperatures over a long period of time causes degradation and discoloration of the polycarbonates.

It is therefore an object of this invention to provide a method for the preparation of linear high molecular weight polycarbonates. It is another object of this invention to provide a method for the preparation of linear high molecular weight polycarbonates from bis-(4-hydroxy-phenyl)-cycloalkanes. It is still another object of this invention to provide polycarbonates which will cross link at moderately elevated temperatures in a short period of time without breaking the molecular chain. It is a further object of this invention to provide a polycarbonate which will crosslink without forming degradation products. It is a further object of this invention to provide insoluble polycarbonates by heating in the presence of a crosslinking agent. It is still a further object of this invention to provide insoluble copolycarbonates by heating in the presence of a crosslinking agent.

The foregoing objects and others which will become apparent from the following description are accomplished in accordance with the invention, generaly speaking, by providing a method for preparing linear high molecular weight polycarbonates by the reaction of bis-(hydroxyphenyl)-cyclododecane either alone or in admixture with other aromatic and/or aliphatic and/or cycloaliphatic dihydroxy compounds with carbonate group yielding derivatives of carbonic acid and thereafter rendered insoluble by heating in the presence of a crosslinking agent.

The bis-(hydroxy-phenyl)-cyclododecane which can be used in the production of the polycarbonate resins of the present invention is represented by the formula

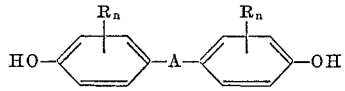

wherein A represents a cyclododecylene radical, R is an alkyl, cycloalkyl, aryl, or alkoxy groups or halogen atoms, and $n$ is an integer of from 0 to 4. Examples of alkyl radicals represented by R above having from 1 to 10 carbon atoms, preferably from 1 to 5 carbon atoms, are methyl, ethyl, propyl, isopropyl, butyl, pentyl, hexyl, octyl, and decyl; aryl radicals such as phenyl, naphthyl, biphenyl, tolyl, xylyl, and so forth; aralkyl radicals such as benzyl, ethylphenyl, and so forth; cycloalkyl radicals such as cyclopentyl, cyclohexyl, and so forth; alkoxy radicals having from 1 to 5 carbon atoms, preferably from 1 to 3 carbon atoms are methoxy, ethoxy, propoxy, butoxy, pentoxy, as well as monovalent hydrocarbon radicals containing inert substituents therein such as halogen atoms may be employed. It will be understood that where more than one R is used, they may be alike or different.

In addition, other dihydroxy compounds may be combined with the bis-(hydroxy-aryl)-cyclododecane. Examples of di-(monohydroxy-aryl)-alkanes which may be used are 1,1-di-(4-hydroxyphenyl)-ethane,
1,1-di-(4-hydroxyphenyl)-propane,
1,1-di-(4-hydroxyphenyl)-butane,
1,1-di-(4-hydroxyphenyl)-2-methyl-propane,
1,1-di-(4-hydroxyphenyl)-heptane,
1,1-di(4-hydroxyphenyl)-1-phenylmethane,
di-(4-hydroxyphenyl)-4-methylphenyl-methane,
di-(4-hydroxyphenyl)-4-ethylphenylmethane,
di-(4-hydroxyphenyl)-4-isopropylphenyl-methane,
di-(4-hydroxyphenyl)-4-butylphenyl-methane,
di(4-hydroxyphenyl)-benzylmethane,
di-(4-hydroxyphenyl)-alpha-furylmethane,
2,2-di-(4-hydroxyphenyl)-octane,
2,2-di-(4-hydroxyphenyl)-nonane,
di-(4-hydroxyphenyl)-1-alpha-furyl-ethane,
1,1-di-(4-hydroxyphenyl)-cyclopentane,
2,2-di-(4-hydroxyphenyl)-decahydronaphthalene,
2,2-di-(4-hydroxy-3-cyclohexylphenyl)-propane,
2,2-di-(4-hydroxy-3-isopropylphenyl)-butane,
1,1-di-(4-hydroxy-3-methylphenyl)-cyclohexane,
2,2-di-(4-hydroxy-3-butylphenyl)-propane,
2,2-di-(4-hydroxy-3-phenylphenyl)-propane,
2,2-di-(4-hydroxy-2-methylphenyl)-propane,
1,1-di-(4-hydroxy-3-methyl-6-butylphenyl)-butane,
1,1-di-(4-hydroxy-3-methyl-6-tert.-butylphenyl)-ethane,
1,1-di-(4-hydroxy-3-methyl-6-tert-butylphenyl)-propane,
1,1-di-(4-hydroxy-3-methyl-6-tert.-butylphenyl)-butane,
1.1-di-(4-hydroxy-3-methyl-6-tert.-butylphenyl)-isobutane,
1,1-di-(4-hydroxy-3-methyl-6-tert.-butylphenyl)-heptane,
1,1-di-(4-hydroxy-3-methyl-6-tert.-butylphenyl)-1-phenyl-methane,
1,1-di-(4-hydroxy-3-methyl-6-tert.-butylphenyl)-2-methyl-2-pentane, 1,1-di-(4-hydroxy-3-methyl-6-tert.-butylphenyl)-2-ethyl-2-hexane,
1,1-di(4-hydroxy-3-methyl-6-tert.-amylphenyl)-butane,
di-(4-hydroxyphenyl)-methane,
2,2-di-(4-hydroxyphenyl)-propane,
1,1-di-(4-hydroxyphenyl)-cyclohexane,
1,1-di-(4-hydroxy-3-methylphenyl)-cyclohexane,
1,1-di-(2-hydroxy-4-methylphenyl)-butane,
2,2-di-(2-hydroxy-4-tert.-butylphenyl)-propane,
1,1,di-(4-hydroxyphenyl)-1-phenylethane,
2,2-di-(4-hydroxyphenyl)-butane,
2,2-di(4-hydroxyphenyl-pentane,
3,3-di-(4-hydroxyphenyl)-pentane,
2,2-di-(4-hydroxyphenyl)-hexane,
3,3-di-(4-hydroxphenyl)-hexane,
2,2-di-(4-hydroxyphenyl)-4-methylpentane,
2,2-di-(4-hydroxyphenyl)-heptane,
4,4-di-(4-hydroxyphenyl)-heptane,
2,2-di-(4-hydroxyphenyl)-tridecane,
2,2-di-(4-hydroxy-3-methylphenyl)-propane,
2,2-di-(4-hydroxy-3-methyl-3'-isopropylphenyl)-butane,
2,2-di-(3,5-dichloro-4-hydroxyphenyl)-propane,
2,2-di-(3,5-dibromo-4-hydroxyphenyl)-propane,
di-(3-chloro-4-hydroxyphenyl)-methane,
di-(2-hydroxy-5-fluorophenyl)-methane,
di-(4-hydroxy-phenyl)-phenylmethane,
1,1-di-(4-hydroxyphenyl)-1-phenylethane, and the like.

Any suitable aliphatic dihydroxy compounds may be used such as for example, ethylene glycol, diethylene glycol, triethylene glycol, polyethylene glycol, thioglycol, ethylene dithioglycol, 1,3-propanediol, 1,3-butanediol, 1,4-butanediol, 1,3-(2-methyl)-propanediol, 1,5-pentanediol, 1,6-hexanediol, 1,8-octanediol, 1,10-decanediol and the like.

Any suitable cycloaliphatic dihydroxy compounds may be used such as, for example, 1,4-cyclohexane-diol, 1,2-cyclohexane-diol, 2,2-(4,4'-dihydroxy-dicyclohexylene)-propane, and 2,6-dihydroxy-decahydronaphthalene.

Examples of suitable aromatic dihydroxy compounds which may be employed are hydroquinone, resorcinol, pyrocatechol, 4,4'-dihydroxydiphenyl, 1,6-dihydroxynaphthalene, 2,6-dihydroxynaphthalene, 1,4-dihydroxynaphthalene, 1,5-dihydroxynaphthalene, dihydroxyanthracene, 2,2'-dihydroxydinaphthyl-1,1'- and o, m, and p-hydroxybenzyl alcohol and the like.

In addition, di-(monohydroxyaryl)-sulfones may be employed such as, for example, di-(4-hydroxyphenyl)-sulfone, di-(2-hydroxyphenyl)-sulfone, di-(3-hydroxyphenyl)-sulfone, di-(4-hydroxy-2-methylphenyl)-sulfone, di-(4-hydroxy-3-methylphenyl)-sulfone, di-(2-hydroxy-4-methylphenyl)-sulfone, di-(4-hydroxy-2-ethylphenyl)-sulfone, di-(4-hydroxy-3-ethylphenyl) - sulfone, di-(4-hydroxy-2-tert.-butylphenyl)-sulfone, di(4-hydroxy-3-tert.-butylphenyl)-sulfone, di-(2-hydroxy-1-naphthyl)-sulfone and the like.

The new polycarbonates can be produced in the same way as the known polycarbonates, that is to say, bis-(hydroxy-phenyl)-cyclododecane, either alone or in admixture with other aromatic and/or aliphatic and/or cycloaliphatic dihydroxy compounds of the kind mentioned above can be reacted with derivatives of carbonic acids selected from the group consisting of carbonic diesters, especially diaryl estrs, phosgene, and bis-chloro carbonic acid esters of dihydroxy compounds.

The polycarbonates can be produced by introducing phosgene into solution of the aforesaid dihydroxy compounds in organic bases such as dimethyl aniline, diethyl aniline, trimethyl amine or pyridine or indifferent organic solvents such as petrol, ligroin, cyclohexane, methylcyclohexane, benzene, tolylene, xylene, chloroform, methylene chloride, carbontetrachloride, trichloroethylene, dichloroethylene, methyl acetate, and ethyl acetate with the addition of an acid binding agent of tertiary amines.

A process particularly suitable for producing polycarbonates consists of introducing phosgene into an aqueous solution or suspensions of alkali or alkaline earth metal salts such as lithium, sodium, potassium, and calcium salts with the dihydroxy compounds, preferably in the presence of an excess of a base such as lithium, sodium, potassium or calcium hydroxide or carbonate. The polycarbonate then precipitates out from the aqueous solution.

The conversion in the aqueous solution is promoted by the addition of reaction inert solvents of the kind mentioned above which are capable of dissolving phosgene and eventually the produced polycarbonate. The phosgene may be used in an equivalent amount, generally, however, it is preferred to use an excess of the phosgene. Suitable temperatures range from about 0° C. up to about 100° C.

Finally, it is also possible to react bis-chloro carbonates with halogen containing di-(monohydroxy-aryl)-alkanes or with other dihydroxy compounds. The condensation proceeds in the presence of an inert solvent, and acid binding materials, e.g., tertiary amines.

When using phosgene or bis-chloro carbonic acid esters as derivatives of the carbonic acid in producing polycarbonates, catalysts also may be advantageous. Such caalysts are, for instance, tertiary or quaternary organic bases or salts thereof, such as, trimethylamine, triethylamine, dimethylaniline, diethylaniline, dimethycyclohexylamine, and pyridine, or, for instance, the corresponding hydrochlorides and tetramethylammonium-hydroxide, triethyloctadecylammonium - chloride, trimethylbenzylammonium-fluoride, triethylbenzylammonium-chloride, dimethyldodecylammonium - chloride, dimethylbenzylphenylammonium-chloride, trimethylcyclohexylammonium-bromide and N-methylpyridinium-chloride in amounts of from about 0.05 to about 5 percent by weight. These compounds may be added to the reaction mixture before or during the reaction.

In addition, it is preferred in some cases to add surface active agents such as alkali metal salts of higher fatty acids or sulfonic acids of higher aliphatic or of aromatic hydrocarbons and polyoxyethylated alcohols and phenols. Greater amounts of the quaternary ammonium bases mentioned above, too, also act as surface active agents.

By adding monofunctional compounds which are capable of reacting with phosgene or with the end groups of the polycarbonates consisting of the chlorocarbonic acid ester group and which terminate the chains, such as the phenols, for instance, the phenol, the tertiary butyl phenyl, the cyclohexyl phenyl, and 2,2-(4,4'-hydroxyphenyl-4,4'-methoxy phenyl)-propane, aniline and methyl aniline, it is possible to regulate the molecular weight of the polycarbonates in wide limits.

In the formation of copolycarbonates, the amount of cyclododecane-bis-phenols may be as little as 5 mol percent based on the total amount of the dihydroxy compounds to achieve a distinct crosslinking effect during subsequent heating. However, it is preferred that the cyclododecane derivatives be used in the range of from about 10 to about 100 mol percent.

The new polycarbonates which are obtained by the processes mentioned above are high molecular weight linear copolycarbonates consisting of repeating units X and Y said units being distributed at random in the chain, the ratio of the units X:Y amounting from about 5:95, preferred from about 10:90, to about 100:0, the chains having end-groups selected from the group consisting of HO— and

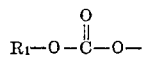

and a molecular weight more than about 10,000, preferably more than about 20,000, and up to about 150,000, X being

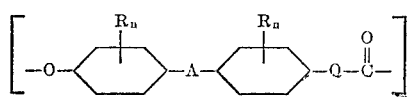

and Y being

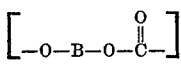

wherein A represents a cyclododecylene radical, R is alkyl, cycloalkyl, aryl, or alkoxy groups or halogen atoms, n is an integer of from 0 to 4, B is an alkylidene, cycloalkylidene or arylene radical and $R_1$ is alkyl up to 4 carbon atoms, cycloalkyl up to 6 carbon atoms or phenyl.

Preferred products are such wherein n is 0, B is

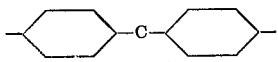

D being an alkylidene radical, preferably the isopropylidene radical, and $R_1$ is phenyl.

These new polycarbonates surprisingly possess improved physical properties such as, for example, increased tensile strength, an exceptionally high transition point of the second order, reduced permability to steam, and increased electric insulation and surface resistance.

In addition, these new polycarbonates when heated at moderately elevated temperatures, i.e., in the range between about 100 and 250° C., preferably between about 100 and 200° C. in the presence of a crosslinking agent becomes substantially insoluble in a relatively short period of time. Crosslinking agents which promote crosslinking of these polycarbonates are for example oxygen or radical forming catalysts such as, dibenzyl peroxide and dicumyl peroxide.

These polycarbonataes are especially suitable in the formation of films, fibers, bristles, foils, coatings, pressed and injection molding bodies which become insoluble by tempering.

The 1,1-bis(4-hydroxy-phenyl)-cyclododecane may be prepared in the following manner.

A mixture containing about 1190 parts of cyclodedecanone, about 3100 parts of phenol and about 8 parts of thioglycollic acid is saturated with hydrogen chloride at room temperature. The reaction mixture is left to stand overnight, heated to from about 40–50° C. the next day, with the addition of hydrogen chloride gas. This procedure is repeated for three days. The mass which is finally completely crystalline is mixed with methylene chloride to form a viscous mass and filtered off with suction. It is slurried once with hot water and the crystalline slurry filtered off with suction. After drying, the colorless product is recrystallized from ethylene chloride. Approximately 1500 parts 1,1-bis-(4-hydroxy-phenyl)-cyclododecane, 60% of theory, were recovered, which had a melting point of about 211° C. and a boiling point of about 235 to 242° C./0.2 mm. Hg.

*Analysis.*—Calculated: C, 81.77%; H, 9.15%. Found: C, 81.28%; H, 8.90%.

Substituted products are obtained by using correspondingly substituted phenols in the reaction with cyclododecanone.

The invention will be further illustrated by the following examples in which parts are by weight unless otherwise specified. It should be noted, however, that these examples are merely given to illustrate and do not limit the invention to the particulars disclosed therein.

EXAMPLE 1

Approximately 30.2 parts of phosgene are introduced over a period of about 1 hour and 50 minutes into a solution containing about 98 parts of 1,1-bis-(4-hydroxy-phenyl)-cyclododecane (Bisphenol Cy), about 75 parts of dry pyridine and about 150 parts of dry methylene chloride. After about 1 hour and 40 minutes, the solution becomes so highly viscous that an additional 280 parts of methylene chloride must be added. After the addition of the phosgene is complete, the reaction mixture is stirred for an additional 15 minutes. The solution is then poured into a mixture of concentrated hydrochloric acid and ice where it separated into layers. The methylene chloride phase is washed neutral with water and, after drying with sodium sulphate, the solvent is evaporated. A polycarbonate having a relative viscosity (5 g./1000 cc. methylene chloride at 25° C.) of 1.925 is recovered.

EXAMPLE 2

Approximately 57 parts of 2,2-bis-(4-hydroxy-phenyl)-propane (Bisphenol A) and about 27 parts of Bisphenol Cy are slurried with about 400 parts water. A solution consisting of about 37 parts of sodium hydroxide and about 85 parts of water is added slowly to this mixture. It is slightly heated in order to obtain a clear solution. After cooling, about 175 parts of methylene chloride are added and approximately 38.5 parts of phosgene are introduced over a period of about an hour. Subsequently, with further stirring, about one part of a wetting agent and 3 parts of a 4 percent triethylamine solution are added. After about 2 hours of additional stirring, the organic phase becomes highly viscous. Enough methylene chloride is then added to form a thin, clear organic phase. This is then washed first with acid and subsequently with water until neutral. After evaporation of the methylene chloride, the resulting polycarbonate is dried in a vacuum at 100° C. A product having a relative viscosity of about 2.01 (measured on a solution of 5 g./1000 cc. methylene chloride at 25° C.) is thus obtained.

EXAMPLE 3

A mixture of about 57 parts of Bisphenol A and about 9 parts of Bisphenol Cy is slurried with about 290 parts of water. A solution consisting of about 31 parts of sodium hydroxide in about 70 parts of water is added slowly into this slurry. About 145 parts of methylene chloride are then added. About 32.5 parts of phosgene are then introduced in the course of about 1 hour, with agitation. With continued agitation, about 0.85 parts of a wetting agent and 2.5 parts of a 4 percent triethylamine solution are subsequently added. After stirring for an additional two hours, the organic phase becomes very viscous. The product is worked up as described in Example 2. The polycarbonate thus obtained possesses a relative viscosity of 1.50 (5 g./1000 cc. at 25° C.).

EXAMPLE 4

Polycarbonate foils were prepared and heated in an aerated drying cabinet. The results of this experiment are illustrated in Table I.

TABLE I

| Polycarbonate from— | Temperature of the tempering | |
|---|---|---|
| | 150° C. | 195° C. |
| Bisphenol A | Soluble after 10½ weeks. | Soluble after 24 hours. |
| Bisphenol Z | Soluble after 10½ weeks, strong decomposition. | Do. |
| Bisphenol Cy | Insoluble after 18 hours. | Partially insoluble after 1 hour, completely insoluble after 2 hours. |
| Bisphenol Cy—2.5+ DBP. | Insoluble after 8 hours. | |
| Bisphenol A 100 parts, bisphenol Cy 10 parts. | | Insoluble after 24 hours. |
| Bisphenol A 100 parts, parts. | | Do. |

Bisphenol A=2,2-bis-(4-hydroxy-phenyl)-propane; Bisphenol Z=1,1-bis-(4-hydroxy-phenyl-cyclohexane); Bisphenol Cy=1,1 - bis-(4-hydroxy-phenyl)-cyclododecane; DBP=dibenzoyl peroxide; solvent=methylene chloride.

In comparing the results of Example 4, the polycarbonates prepared from the reaction of phosgene with 1,1-bis-(4-hydroxy-phenyl)-cyclododecane are rendered insoluble by heating at a temperature between about 150° C. and 195° C., while polycarbonates prepared from the reaction of phosgene with either Bisphenol Z [1,1-bis-(4-hydroxy-phenyl)-cyclohexane] or Bisphenol A [2,2-bis-(4-hydroxy-phenyl)-propane] remain soluble even after prolonged heating at these temperatures. In fact, polycarbonates obtained from 1,1-bis-(4-hydroxy-phenyl)-cyclododecane were rendered insoluble in methylene chloride after 18 hours at 150° C., whereas polycarbonates obtained from Bisphenol A or Bisphenol Z were still soluble even after 10.5 weeks. In addition, heating Bisphenol Z at a temperature of 150° C. resulted in the formation of decomposition products. Furthermore, polycarbonates prepared from a mixture of 1,1-bis-(4-hydroxy-phenyl)-cyclododecane and Bisphenol A were rendered insoluble when heated to a temperature of about 195° C. for 24 hours whereas polycarbonates prepared from Bisphenol A alone were soluble even after 24 hours. Surprisingly, it was found that the polycarbonates of this invention when used either alone or in combination with other polycarbonates undergo cross-linking at temperatures substantially below polycarbonates prepared from bis-(hydroxy-aryl)-alkanes or cycloalkanes.

Although the invention has been described in considerable detail in the foregoing, it is to be understood that the purpose of such detail is solely to illustrate the embodiments of the invention and that modification can be made by those skilled in the art without departing from the spirit and scope of the invention except as set forth in the claims.

What is claimed is:

1. High molecular weight linear copolycarbonates comprising repeating units X and Y, said units being distributed at random in the chain, the ratio of the units X:Y amounting from about 5:95 to about 100:0, the chains having end-groups selected from the group consisting of HO— and

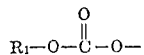

and a molecular weight more than about 10,000 and up to about 150,000, X being

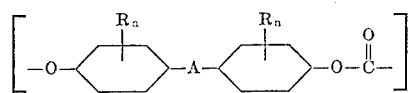

and Y being

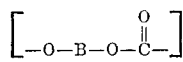

wherein A represents a cyclo-dodecylene radical, R is alkyl, cycloalkyl, aryl, aralkyl or alkoxy groups or halogen atoms, $n$ is an integer of from 0 to 4, B is an alkylidene, cycloalkylidene, diarylalkylidene, diarylsulfone or arylene radical and $R_1$ is alkyl up to 4 carbon atoms, cycloalkyl up to 6 carbon atoms, alkyl phenyl, cycloalkyl phenyl, phenyl amino or phenyl.

2. Copolycarbonates according to claim 1, wherein the ratio of the units X:Y amounts from about 10:90 to about 100:0.

3. Copolycarbonates according to claim 1, wherein the molecular weight of the copolycarbonates amounts from about 20,000 to about 150,000.

4. Copolycarbonates according to claim 1, wherein in the formulae mentioned in claim 1 $n$ is 0, B is

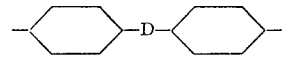

D being an alkylidene radical, and $R_1$ is phenyl.

5. Copolycarbonates according to claim 4, wherein D is the isopropylidene radical.

6. Cross-linked high molecular weight polycarbonates obtained by heating the polycarbonates of claim 1 to temperatures between about 100 and about 250° C. in the presence of a cross-linking agent.

7. Cross-linked polycarbonates obtained by heating the polycarbonates of claim 1 to temperatures between about 100 and about 200° C.

8. Cross-linked polycarbonates obtained by heating the polycarbonates of claim 1 to temperatures between about 100° and about 250° C. in the presence of oxygen as cross-linking agent.

9. Cross-linked polycarbonates obtained by heating the polycarbonates of claim 1 to temperatures between about 100° and about 250° C. in the presence of a radical forming catalyst as cross-linking agent.

References Cited

UNITED STATES PATENTS

| 2,950,266 | 8/1960 | Goldblum | 260—47 |
| 3,014,891 | 12/1961 | Goldblum | 260—47 |
| 3,021,305 | 2/1962 | Goldberg | 260—47 |

GEORGE F. LESMES, *Primary Examiner.*

U.S. Cl. X.R.

260—619, 860